United States Patent
Mamiya et al.

[19]

[11] Patent Number: 6,021,029
[45] Date of Patent: Feb. 1, 2000

[54] REMOVABLE DISK CARTRIDGE AND MANUFACTURING METHOD THEREOF

[75] Inventors: Toshio Mamiya, Tokyo; Kazuyuki Yamamoto; Takashi Yamada, both of Kanagawa; Kazuo Takahashi, Tokyo; Eiji Oshima, Kanagawa, all of Japan

[73] Assignee: Sony Corporation, Tokyo, Japan

[21] Appl. No.: 08/916,939

[22] Filed: Aug. 21, 1997

[30] Foreign Application Priority Data

Aug. 26, 1996 [JP] Japan .................................. 8-224096

[51] Int. Cl.[7] .................................................. G11B 23/03
[52] U.S. Cl. ............................................................ 360/133
[58] Field of Search ..................................... 360/132, 133; 369/291; 206/307, 308.1, 308.3

[56] References Cited

U.S. PATENT DOCUMENTS

| | | | |
|---|---|---|---|
| 4,608,617 | 8/1986 | Oishi et al. | 360/133 |
| 4,646,192 | 2/1987 | Droux et al. | 360/133 |
| 4,646,285 | 2/1987 | Ogusu et al. | 369/291 |
| 4,780,784 | 10/1988 | Covington et al. | 360/133 |
| 4,864,452 | 9/1989 | Thompson et al. | 360/133 |
| 5,084,861 | 1/1992 | Takahashi | 369/291 |
| 5,587,994 | 12/1996 | Nagaura et al. | 369/291 |
| 5,636,095 | 6/1997 | McGrath et al. | 360/133 |
| 5,671,109 | 9/1997 | Sumner et al. | 360/133 |
| 5,691,860 | 11/1997 | Hoppe | 360/133 X |

*Primary Examiner*—William R. Korzuch
*Attorney, Agent, or Firm*—Frommer Lawrence & Haug, LLP.; William S. Frommer

[57] ABSTRACT

A removable disc cartridge including a case including a top shell and a bottom shell which contains rotatably a disk. The removable disk cartridge is insertable into a disk drive and has a curved portion formed on one side, an opening formed on a portion of the curved portion, and a shutter for opening and closing the opening. The curved portion in this disk cartridge is asymmetrical in the left and right directions with respect to a center line along the direction of insertion into the disk drive. The removable disk cartridge further has a guide groove on at least one other side thereof and an arm which is disposed in the guide groove for opening and closing the shutter.

3 Claims, 14 Drawing Sheets

REMOVABLE DISK CARTRIDGE AND MANUFACTURING METHOD THEREOF

BACKGROUND OF THE INVENTION

1. Field of the Invention

This invention relates to a miniature light-weight removable disk cartridge containing a disk with a large memory capacity.

2. Description of Related Art

Removable disk cartridges of this sort have been disclosed in, for example, ① U.S. Pat. No. 5,218,503, ② U.S. Pat. No. 5,262,918, ③ U.S. Pat. No. 5,280,403, ④ U.S. Pat. No. 5,317,464, ⑤ U.S. Pat. No. 5,398,141, and ⑥ U.S. Pat. No. 5,444,586 as related conventional art.

In the above-mentioned conventional examples ① to ⑤, every cartridges have a structure which is formed of approximately square in the plan view and have an arrow indication for indicating the attaching direction on the upper surface thereof, and have an attaching guide groove along the attaching direction partially on the surface or back surface. In these conventional examples, the side that is indicated by the arrow is opened entirely, a door which opens outside is attached on the side with interposition of a door attaching mechanism so that an actuator is allowed to come in and go out through the opened side, a mechanism for moving the door is provided at the position near the door, the door attaching mechanism is provided with two pins disposed with a vertical predetermined interval, and the one pin has a finger mechanism.

In the above-mentioned conventional example ⑥, a cartridge has a structure which formed approximately square in the plan view and has a door which is opened and closed rotationally provided in the cartridge and which is supported rotationally by a spacer secured by a vis screwed from the front side in the inside of the front side of the cartridge. Though no indication of the attaching direction is indicated, a half opening is provided on one side, a circular arc door is provided along the corner in the inside of the opening, and the side is identified as the end.

Further, in the conventional example, the periphery is formed high with a step excepting the side face where the door is attached on the back side of the cartridge. One reason of the step is that the projected portion to the back side formed of high is served as a guide for preventing erroneous attaching and another reason of the step is that a cartridge screw for moving a disk vertically engaged with the central portion of the base plate of the cartridge in order to connect a disk provided in the cartridge to the rotational driving section of the disk drive is projects to the back side.

The above-mentioned conventional arts ① to ⑤ are disadvantageous in that a cartridge collides always with the insertion opening of the disk drive during initial attaching operation to the disk drive when the cartridge is inserted in erroneous direction because the cartridge is formed approximately square though the attaching direction is indicated with an arrow on the cartridge and the cartridge formed of black resin on which the arrow indication is formed of merely concavoconvex makes it difficult to distinguish the arrow indication, and in that the cartridge itself can not be thinned because a guide groove is provided on the front side or back side of the cartridge.

The above-mentioned conventional example ⑥ is also disadvantageous as the above-mentioned examples ① to ⑤ because the cartridge is formed approximately square as a whole, and has a projected guide on the back side.

Accordingly, cartridges of the conventional examples ① to ⑥ involve a functional and configurational problem to be solved in order to realize a thin cartridge which is attached not erroneously.

Further, the above-mentioned conventional arts ① to ⑤ are disadvantageous in that a cartridge can not be made thin as a whole because a space for attaching the door and for operation of the door is necessary due to positioning of the two pins disposed vertically with a certain interval in the door attaching mechanism and due to application of the finger mechanism in the door moving mechanism, and in that dust and soil coming from the outside are apt to contaminate the inside because much air can flow into the interior due to one side being opened entirely and the structure that the center core of a disk is exposed. Such dust and soil which have penetrated into the interior can cause damage of a disk contained therein.

The above-mentioned conventional example ⑥ is also disadvantageous in that dust can cause damage of a disk provided in the interior because dust is apt to be accumulated at the corner due to the always opened circular arc door disposed near the corner on the side and the accumulated dust comes in when the inside door is opened for use.

Accordingly, the conventional examples ① to ⑥ involve a problem to be solved in order to eliminate the problem associated with dust which comes from the outside and realize a cartridge with improved dust proof.

Further, the above-mentioned conventional arts ① to ⑤ are disadvantageous in that a cartridge can not be made thin because the door has a structure which opens in the front side, and the large number of needed parts of the door attaching mechanism and door moving mechanism such as pin or finger is necessary, and in that workability in manufacturing process of the disk cartridge is significantly inefficient because the attaching direction of such mechanisms is quite different from the attaching direction of top section and bottom section which are components of the housing, and the separate attaching work is necessary.

The above-mentioned conventional example ⑥ is also disadvantageous in that a cartridge can not be made thin because the door attaching mechanism and door moving mechanism comprise the large number of needed parts such as the door, spacer, link, and spring, and in that manufacturing process of disk cartridges is very complex and workability is inefficient, which lead to high cost, particularly because the attaching direction of the door moving mechanism is quite different from the attaching direction of the top and bottom sections which are component of the housing, and the door moving mechanism should be attached in the separate attaching process including the door attaching mechanism.

The above-mentioned conventional example requires a cartridge screw for moving vertically a disk contained in the cartridge and a holding ring, these parts make the cartridge more difficult to be made more thin, and also these parts requires difficult attaching work. Such conditions make the manufacturing process of disk cartridges more difficult.

Accordingly, the conventional examples ① to ⑥ involve problems to be solved in order to realize a thin disk cartridge comprising the reduced number of needed parts which are manufactured with improved workability.

To solve the problem of the above-mentioned conventional examples, the removable disk cartridge in accordance with the present invention contains rotatably a disk in a case comprising the combined top shell and bottom shell, the disk is driven from the outside, wherein the front end of the disk cartridge is formed in curvature, the curvature is asymmetrical in right-left direction with respect to the center line along the insertion direction of the cartridge, and an opening which is opened by the shutter member is provided on a part of the curvature.

The removable disk cartridge in accordance with the present invention has additional structure that the length of the opening is shorter than ½ the length of the curvature, a guide groove is provided at least on one side, the guide groove is formed with varying the depth and width, and a member for opening and closing the shutter member is provided in the guide groove, and a changer grip means is provided on both sides.

The front end of the removable disk cartridge of the present invention is formed asymmetrically with respect to the center line along the insertion direction. Therefore the insertion direction can be recognized naturally with reference to the configuration of the disk cartridge without providing an arrow indication for indicating the insertion direction, thus erroneous insertion is prevented. The curvature of the front end is formed in asymmetry in right-left direction with respect to the center line along the insertion direction of the cartridge and the length of both sides is different from each other. Therefore, when the cartridge is inserted erroneously inside out, the cartridge stops and does not proceed further during insertion because the insertion length of both sides is different from each other, and the erroneous insertion can be recognized because the projected length is too long when the cartridge is stopped.

The removable disk cartridge in accordance with the present invention has further additional structure that the center core of the disk is supported at least on three points on the one shell, the shutter member comprises a plate-like flat plate section and a circular arc shutter section formed in the direction perpendicular to the end of the flat plate section, the flat plate section of the shutter member is formed in a long delta shape as a whole, the length of the flat plate section is formed with a length so as to be contained in the interior of the disk cartridge, and the flat plate section is provided with a groove hole in order to avoid three point supporting of the disk, the shutter member is provided in the inside of the cartridge and supported on a shaft rotatably at the position near the rear end, a cutoff is provided at the position corresponding to the chuck hole in order to expose the center core of the disk outside when the shutter is opened, and a guide groove is provided at least on one side, the guide groove is formed varying in the width and depth, and a member for opening and closing the shutter member is positioned in the guide groove.

The removable disk cartridge of the present invention has the structure that the front end is formed in curvature and an opening is provided on the curvature, and a shutter member is provided along the curvature, thereby differently from the conventional door which moves vertically. So that the opening is maintained closed and there is no partial opened portion, dust is significantly prevented from penetrating, and damage of a disk is prevented.

The shutter member also opens and closes a hole for driving a disk, thereby the disk cartridge is closed when not in use, and dust is prevented from penetrating thereinto.

To solve the problem of the conventional examples, the method for manufacturing removable cartridges in accordance with the present invention comprises a series of steps including a step for forming the top shell and the bottom shell having a curvature at least on one side in asymmetry, a step for incorporating and combining a shutter member, a pressing means, a disk, and the top shell to the bottom shell from one direction, and a step for severely combining the bottom shell and the top shell.

In the method for manufacturing removable disk cartridges in accordance with the present invention, needed parts such as a shutter member, a disk, and a top shell are merely incorporated onto a bottom shell using the bottom shell as a base for assembling, the number of needed parts is reduced and all the needed parts are incorporated from one direction in the assembling work, working efficiency is thus significantly improved.

The top shell and bottom shell are temporarily combined automatically when the top shell is incorporated, and incorporated parts are not scattered even if the cartridge is turned inside out during combining work.

DETAILED DESCRIPTION OF THE PREFERRED EMBODIMENTS

Figure 1:
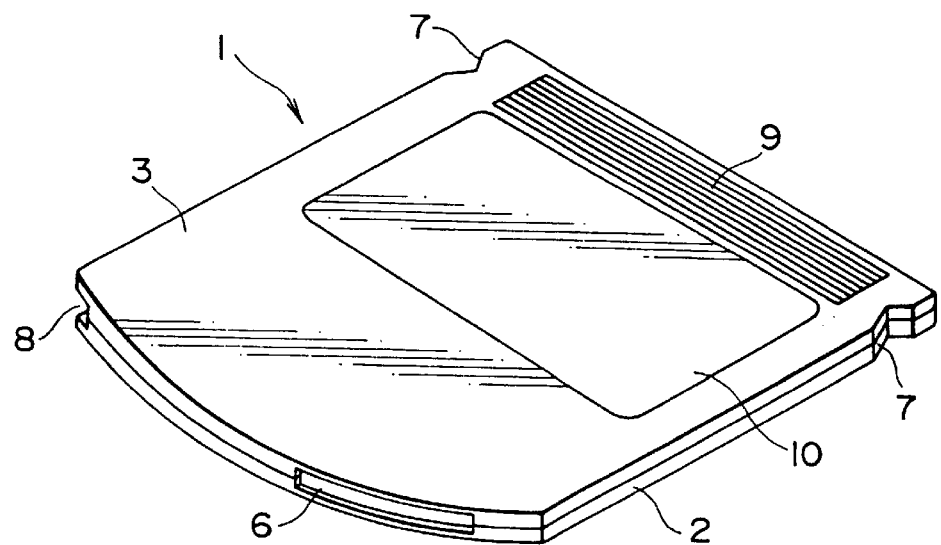
FIG. 1 is a perspective view of a removable disk cartridge in accordance with the present invention.
Figure 2:
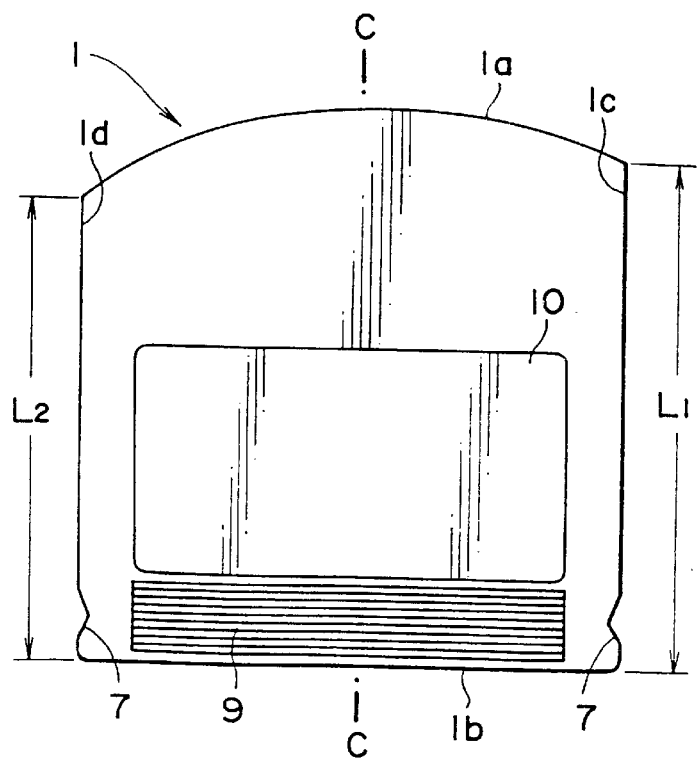
FIG. 2 is a plan view of the cartridge.
Figure 3:
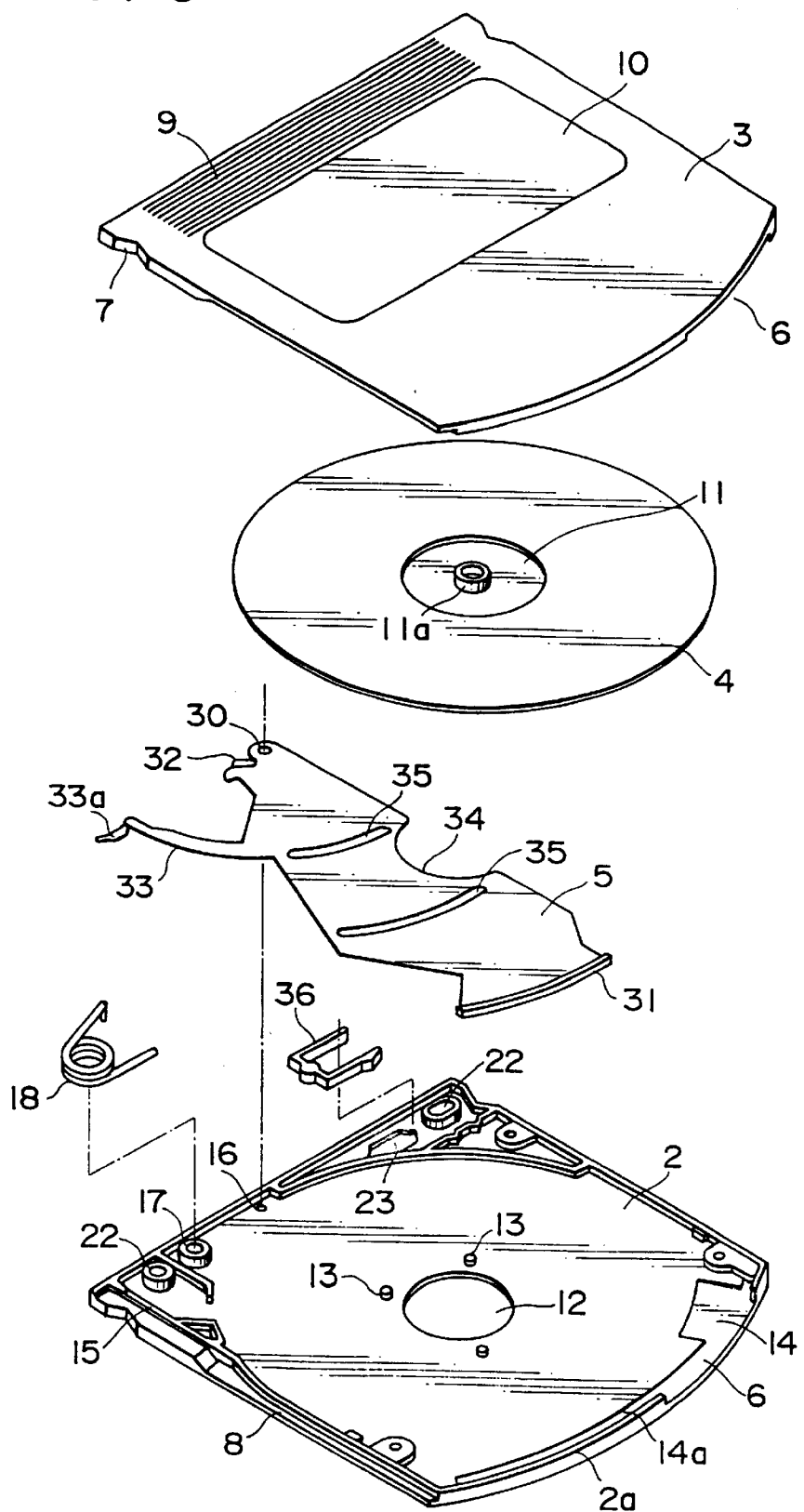
FIG. 3 is a perspective exploded view of the cartridge.

Embodiments of the removable disk cartridge (referred to as disk cartridge hereinafter) in accordance with the present invention will be described in detail hereinafter with reference to the drawings. FIGS. 1 to 3 show a preferred embodiment of the present invention, a disk cartridge 1 is formed by combining the bottom shell 2 and top shell 3 which are formed in almost the same shape, a disk 4 is provided rotatably in the internal, and a shutter member 5 is provided which has an opening and closing movement.

The disk cartridge 1 is attached to a certain disk drive to be described hereinafter for use, and herein the end that is attached first is referred to as front end and the opposite end is referred to as rear end.

The front end 1a of the disk cartridge 1 is formed non-linearly namely of a certain curved face, the curved face is formed asymmetrically with respect to the center line C—C provided along the front-rear direction, thereby the length of both sides 1c and 1d is different each other as L1>L2. Such structure that the length of both sides is different is useful for preventing erroneous attaching of the disk cartridge to a disk drive.

On the portion of the front end 1a which is formed in a curvature, an opening 6 is formed for the access of an actuator arm on which a head is provided as described hereinafter, the length of the opening 6 is shorter than ½ the length of the curvature of the front end 1a, more preferably approximately shorter than ⅓, and the opening is provided with deviation to the shorter side 1d.

The rear end 1b of the disk cartridge 1 is formed linearly, and on the rear end of both sides 1c and 1d changer grip means namely triangular-shaped recesses 7 are formed. The changer grip means are effective for gripping with a suitable arm mechanism when the disk cartridge 1 is set on or picked up from a disk drive automatically.

A guide groove 8 is formed on the longer side 1c of the disk cartridge (the side distant far from the side where the opening 6 is provided). The guide groove 8 is mainly served for ensuring open and closing motion of the shutter member 5, and guides the open and closing member means provided on the disk drive side. As will be described hereinafter, the guide groove 8 serves secondarily as a guide for proper attaching to a disk drive.

Further, a non-slip member 9 is provided near the rear end on the front end of the disk cartridge, and an indication seal pasting area 10 is provided adjacent to the non-slip member 9. The non-slip member 9 comprises a plurality of linear ridges, and the seal pasting area 10 is formed in a rectangular shape and recessed slightly from the surface.

The disk 4 has the same structure as used typically, and has a disk-like shape and a center core 11 wherein center core rotation is transmitted. The disk 4 used in the present invention is made of synthetic resin, has a diameter of 2.5 inches, and a cylindrical support 11a is provided at the center of the center core 11.

The center core 11 may comprise a one piece metal plate and is attached using a pasting means, or may comprise two metal plates, wherein one of the metal plates is used as a base plate and the other is used as an auxiliary spring plate, and the disk 4 is pressed between the two metal plates elastically by tightening both metal plates with the support 11a at the center of the center core 11. Nevertheless, the center core 11 of the disk 4 is attached in some manner. However, the structure of the disk 9 is by not limited to the structure shown in the drawings.

Figure 4A:
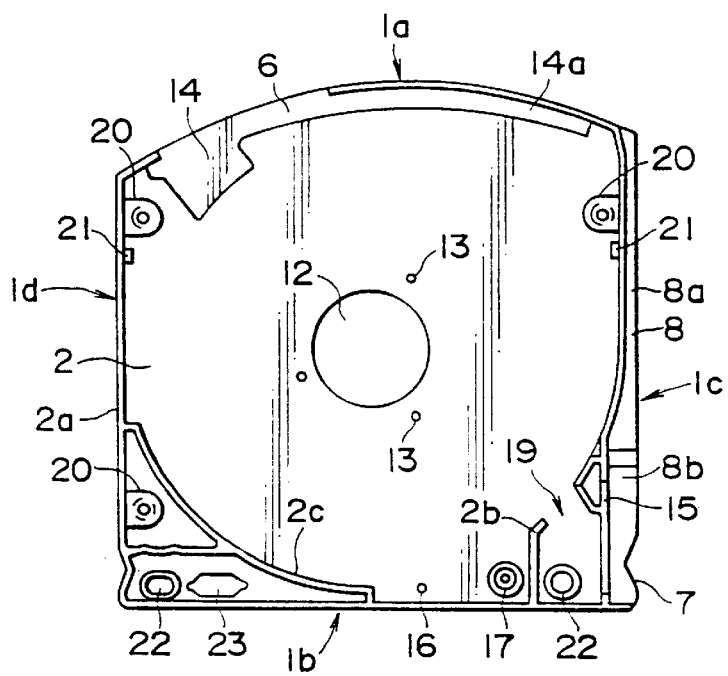
FIG. 4A is a plan view for illustrating the interior of the bottom shell which is a component of the cartridge and FIG. 4B is a side view of the same.
Figure 4B:
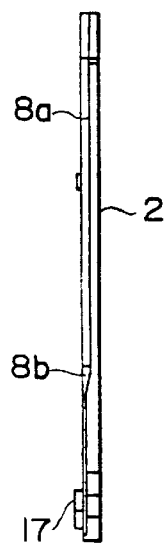

A rib like rising wall 2a is provided along the periphery of the bottom shell 2 as shown in FIGS. 4A and 4B, and a chuck hole 12 is provided at the center for attaching to a disk drive and on which the above-mentioned center core 11 of the disk 4 is located, and at least three adjacent projections 13 are provided around the chuck hole 12 for retaining a space between the center core 11 and the bottom shell 2 and for horizontally supporting the center core.

The peripheral rising wall 2a lacks partially in the portion corresponding to the opening 6 of the front end 1a, a thin wall section 14 is provided continuously from the opening 6 for preventing collision between the actuator arm and the bottom shell 2, a thin wall section 14a provided for guiding the shutter member 5 is formed continuously from the thin wall section 14 formed in a circular arc shape along the inside of the rising wall 2a.

On the side 1c where the guide groove 8 is formed, the guide groove 8 is formed by forming the rising wall 2a with slight inside deviation from the side end of the bottom shell, and the depth and width of the guide groove varies differently dependent upon the position. Indetail, the groove 8a is shallower and wider in the range near the front end and the groove 8b is deeper and narrower in the range near the rear end. In this case, the position where the depth and width are varied is positioned at the middle point of the side 1c and the depth and width are varied mainly in the range of the rear end side, particularly the width is formed extremely narrow like a slit, the portion of the rising wall 2a corresponding to the extremely narrow groove is provided with a step 15 which is formed slightly low.

Further, a shaft 16 which is the rotation center of the shutter member 5 projects near the rear end 1b at a position with a deviation from the center (at the position with a small deviation to the right side in the drawing), and a boss 17 is provided near the shaft 16. The boss 17 is provided with a pressing means 18 such as a center coil spring for pressing the shutter member 5 in the direction to close always, and is formed slightly higher than the rising wall 2a.

Reinforcing ribs 2b and 2c are provided inside the vicinity of the corner continuous from the rising wall 2a in the rear end 1b, the ribs are formed in an approximately circular arc shape corresponding to the peripheral shape of the disk 4 which is contained in the interior, and the rib 2b lacks partially to form a space 19.

A plurality of combining sections 20 are provided on the bottom shell for combining the bottom shell to the top shell 3, and temporarily retaining hooks 21 are provided on the sides 1c and 1d for temporarily retaining the top and bottom shells combined when the shells are to be assembled. Further, a positioning hole 22 for positioning the disk cartridge 1 to a disk drive when the disk cartridge is set to the disk drive, and a write protect switch hole 23 for preventing erroneous writing in the disk 4 are provided.

Figures 5A, 5B:
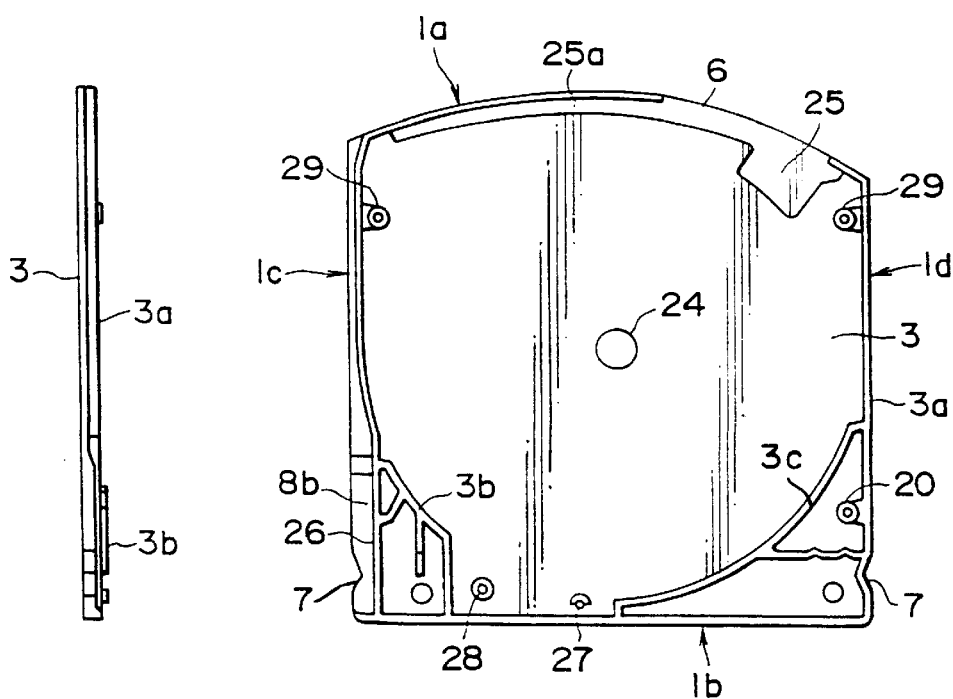
FIG. 5A is a plan view for illustrating the interior of the top shell which is a component of the cartridge and FIG. 5B is a side view of the same.

The top shell 3 shown in FIGS. 5 (A) and (B) is provided with a rib like rising wall 3a along the periphery as the above-mentioned bottom shell 2, and a cylindrical projection 24 is formed approximately at the center of the top shell 3, the cylindrical support 11a provided to the center core 11 of the disk 4 is engaged with the inside of the projection 24 to support the disk 4 maintaining it apart from the top shell 3 and to prevent decentering of the disk 4.

The peripheral rising wall 3a lacks partially in the portion corresponding to the opening 6 on the front end 1a, a thin wall 25 is provided continuously from the opening 6 for preventing collision of the actuator against the top shell 3, and a thin wall 25a is formed in a circular arc shape along the inside of the rising wall 3a for guiding the shutter 5 continuously from the thin wall 25. This structure is symmetrical between the above-mentioned bottom shell 2 and the top shell 3.

In the case of the top shell 3, the guide groove 8 is formed by forming the rising wall 3a with a slight deviation from the side 1c where the guide groove 8 is formed, and the guide groove 8 has a structure that the depth and width are varied as the bottom shell 2.

In detail, the groove 8a is formed shallower and wider in the range near the front end and the groove 8b is formed deeper and narrower in the range near the rear end. In this case, the position where the depth and width are varied is positioned at the middle point of the side 1c and the depth and width are varied mainly in the range of the rear end side, particularly the width is formed extremely narrow like a slit, the portion of the rising wall 3a corresponding to the extremely narrow groove is provided with a step 26 which is formed slightly low. This structure is symmetrical between the above-mentioned bottom shell 2 and the top shell 3.

On the top shell 3, a shaft bush 27 is formed at the position corresponding to the shaft 16 provided on the bottom shell 2, and a boss bush 28 is formed at the position corresponding to the boss 17. These bushes serve to for positioning when combining with the bottom shell 2 and for reinforcing.

Further, reinforcing ribs 3b and 3c are provided inside the vicinity of the corner continuous from the rising wall 3a in the rear end 1b, the shape of these ribs approximately corresponds to the shape of the ribs 2b and 2c of the bottom shell 2 substantially, and these ribs and the ribs of the bottom shell 2 are disposed in symmetry. The rib 3b is formed partially in height so that the rib 3b occupies the space 19 which is formed by partially lacking in the rib 2b of the bottom shell 2. The combining section 29 is formed correspondingly to the combining section 20 provided on the bottom shell 2, and both combining sections 20 and 29 are disposed in symmetry.

Figure 6:
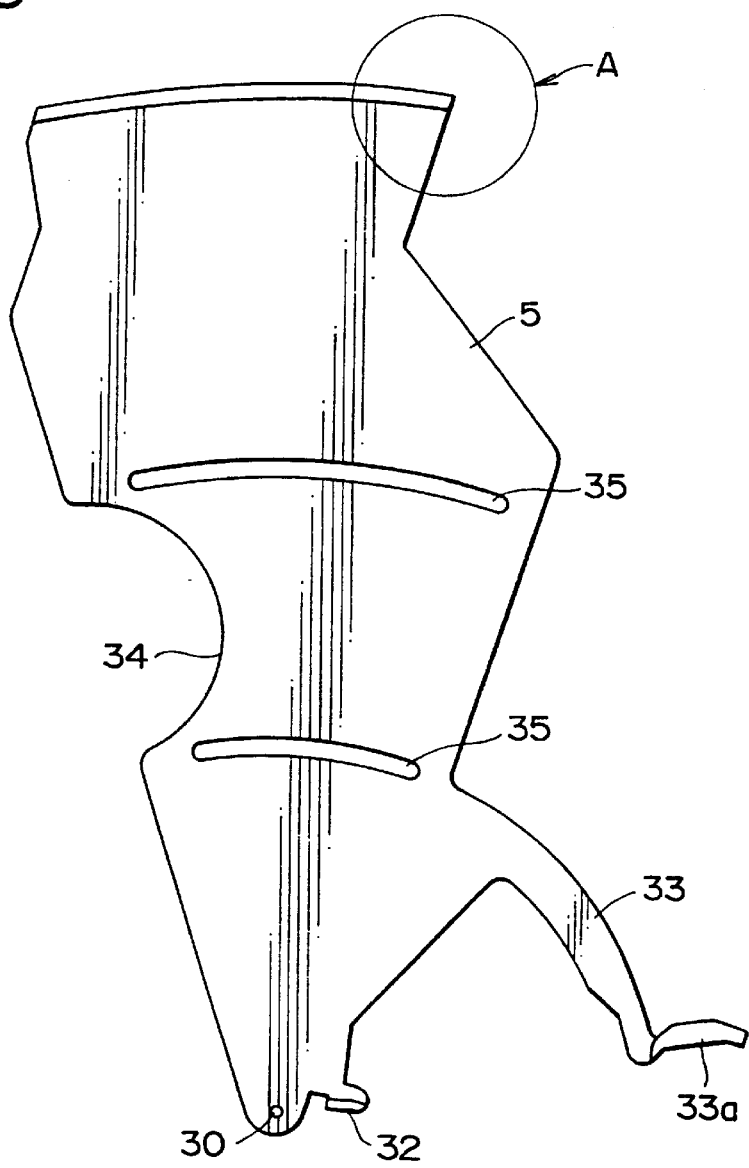
FIG. 6 is a plan view of a shutter member used in the cartridge.

The shutter member 5 is shown in FIG. 6. For example, the shutter member 5 is formed of a metal plate with a special shape which is formed by press-punching a metal plate, and is used so that the side with burr generated by punching is not in contact with the inside wall of the bottom shell 2. Of course, a burr of this sort is removed almost completely through a desired burr removing process.

A shaft hole 30 to be served as a center of rotation is formed at the one end of the shutter member 5, and a shutter 31 formed in a circular arc shape having a length and width sufficient to cover the opening 6 is provided on the other end. The portion where the shaft hole 30 is formed in a shape of a small round projection, a rising hook 32 where the rotational pressing means 18 is engaged is provided near the small projection, and further an open-close arm 33 formed in a shape of circular arc projects and continuously on the side at the position apart furthest from the hook 32.

The arm 33 is formed in a shape of circular arc along a circle with the center at the shaft hole 30, and the end of the arm 33 is served as the open-close end, namely the force end 33a. The force end 33a has a partial rising portion and has an end formed in bent so as to be positioned flat as a whole.

A circular arc cut-off 34 is formed on the approximately middle point of the side opposite to the side of the arm 33. The diameter of the cut-off 34 is slightly larger than that of the chuck hole 12 disposed at the center of the bottom shell 2. Two groove holes 35 in the shape of circular arcs are formed near the cut-off 34 in the direction across the shutter member 5. These circular arcs coincide with the circular arcs having the center at the shaft hole 30.

Two projections out of three projections 13 disposed around the chuck hole 12 of the bottom shell 2 are to be engaged with the groove holes 35, the projections 13 are formed higher than the thickness of the shutter member 5, thereby the top of each projection 13 projects upwardly through the groove hole 35, and the projected top portions thereof support the center core 11 of the disk 4, and therefore open-close motion of the shutter member 5 is not hindered.

Figure 7:
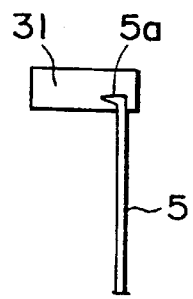
FIG. 7 is an enlarged side view of the part shown by A in FIG. 6.

The shutter 31 is formed of, for example, plastic material. In this case, as shown in FIG. 7, the shutter 31 is formed by monolithic molding of plastics so that the end 5a which is a small bent portion of the shutter member 5 formed of metal is embedded in the plastics, the one end extends toward the top shell 3 side, and the other end projects slightly toward the side of bottom shell 2.

By forming the shutter 31 as described herein above, the thin wall 14a of the bottom shell 2 and the thin wall 25a of the top shell 3 serve as a guide, the shutter member 5 formed of a metal plate is allowed to be opened and closed without rasping the inside wall of the bottom shell 2, and thereby this structure prevents the generation of dust such as shavings due to rasping. When an external pressing force is applied to the front end 1a of the disk cartridge, the shutter 31 is brought into contact with thin walls 25a and 14a of the top and bottom shells 3 and 2, and this structure provides improved strength of the front end 1a in the thickness direction.

Figure 8:
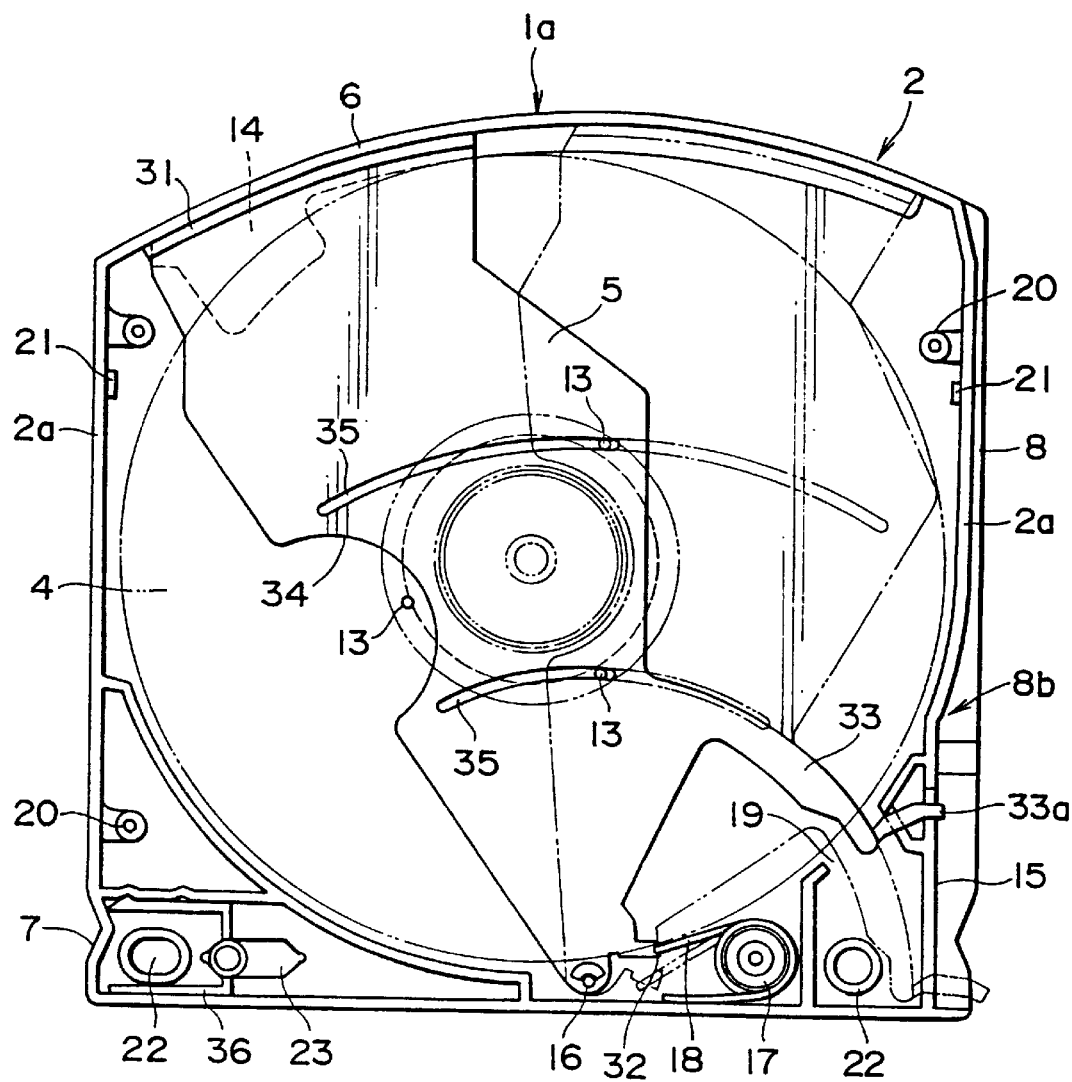
FIG. 8 is a plan view for illustrating the shutter member attached to the bottom shell of the cartridge.

For assembling respective parts described herein above, as shown in FIG. 8, the shutter member 5 is incorporated on the bottom shell 2 which is used as the base. In the incorporating work of the shutter member 5, the shaft 16 is fitted to the shaft hole 30, and the shutter 31 is faces to the opening 6, thus projections 13 are fitted to the corresponding groove holes 35, further the arm 33 is positioned in the space 19, and the force end 33a can be regarded as an open-close means of the shutter member 5 itself, and the open-close means is positioned substantially at the guide groove of the disk cartridge.

In this condition, the pressing means 18 is fitted to the boss 17, the one end of the pressing means 18 is hooked on the hook 32, and the other end is hooked on the inside of the rising wall 2a. The pressing means 18 which is attached as described herein above presses always the shutter 31 of the shutter member 5 so as to cover the opening 6, and the force end 33a of the arm 33 lifted to the front end 1a on the step 15.

Next, a disk 4 is set at the predetermined position by placing it on the shutter member 5, then the center core 11 of the disk 4 is supported by three projections 13, and thus the disk 4 is set in the condition that the disk is substantially not in contact with the shutter member 5, that is, the disk 4 is floating above the shutter member 5. All the necessary parts including the write protection switch 36 which can receive access from the outside of the bottom shell 2 are incorporated.

After the respective parts are incorporated to the bottom shell 2 as described herein above, the top shell 3 is incorporated by covering the bottom shell 2 with the top shell 3, when, the hook 21 is hooked on the predetermined position of the top shell 3 to maintain both top and bottom shells combined, that is, both top and bottom shells are temporarily combined, thereafter the combining sections 20 and 29 are combined solidly using a suitable means, for example, combining means such as vis screwing and high frequency welding to complete a disk cartridge 1.

Figure 9:
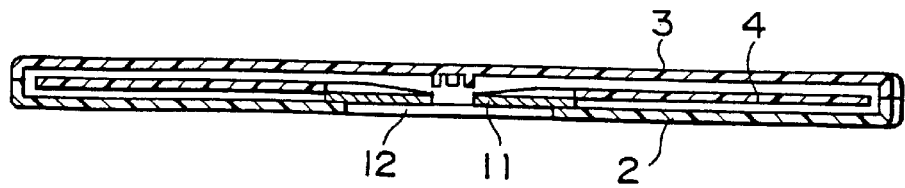
FIG. 9 is a cross-sectional view of the cartridge.
Figure 10:
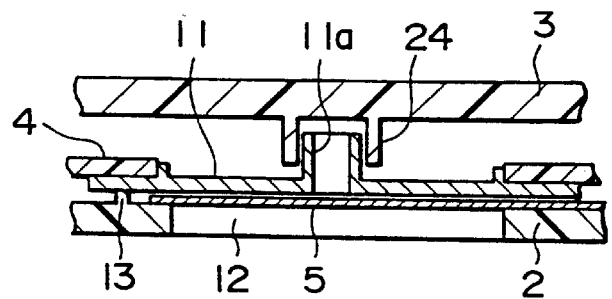
FIG. 10 is a partially enlarged cross-sectional view for illustrating a disk supported in the cartridge.

In combining the bottom shell 2 and top shell 3 together, as shown in FIG. 9 and FIG. 10, the cylindrical support 11a provided to the center core 11 is fitted into the inside of the cylindrical projection 24 provided at the center of the top shell 3 to position the center of the disk 4, and the disk 4 is supported without contact with the top shell 3, and thus the disk 4 is supported horizontally apart from both top and bottom shells by the above-mentioned three projections 13 and cylindrical projection 24.

The shutter 31 of the shutter member 5 is positioned at the thin walls 14 and 25, and the arm 33 is positioned at the space 19, and thus the shutter member 5 does not move upward because it is maintained in the space 19 by the projected rib 3b of the top shell 3. Though the shutter member 5 is rotatable, the shutter 31 opens and closes the opening 6 substantially in sliding motion, the shutter member 5 covers the opening 6 and also the flat plate portion of the shutter member 5 covers the chuck hole 12 which is served for attaching the disk 4 to the disk drive, and thus the disk cartridge 1 is tightly closed entirely along the periphery. The thick wall shutter 31 is held between the top and bottom shells 2 and 3 in the inside of the opening 6, and the existence of the shutter 31 contributes to enhancement of rigidity of the disk cartridge as a whole.

Figure 11:
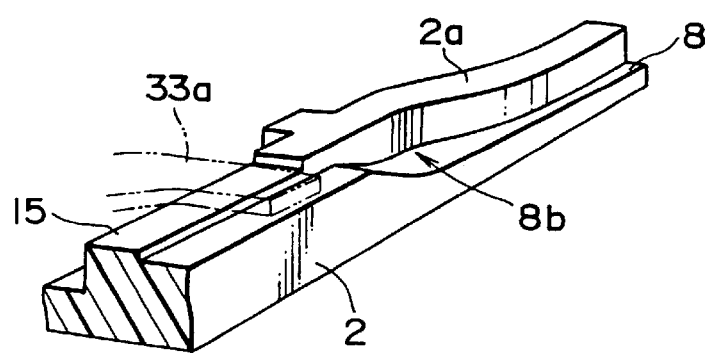
FIG. 11 is a partially enlarged perspective view for illustrating the structure of a guide groove of the cartridge.
Figure 12:
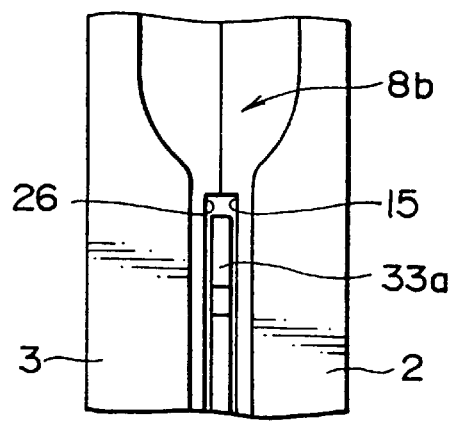
FIG. 12 is a partially enlarged side view of the guide groove.
Figure 13:
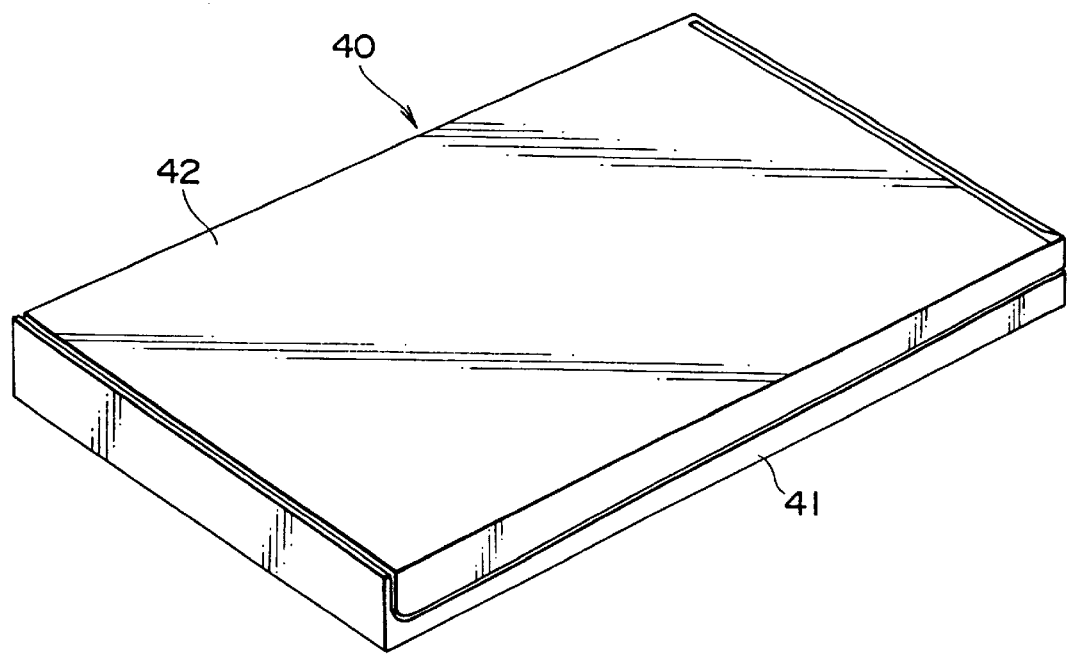
FIG. 13 is a perspective view for illustrating an example of a disk drive for use attached to the cartridge.
Figure 14:
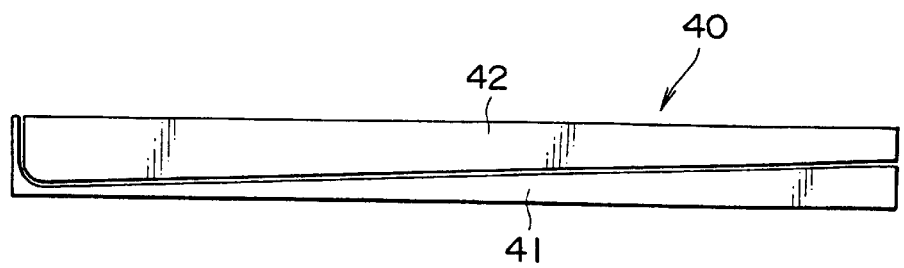
FIG. 14 is a side view of the disk drive.

The force end 33a of the arm 33 of the shutter member 5 is positioned at the space formed between the step 15 of the bottom shell 2 and the step 26 of the top shell 3 as shown in FIG. 11 and FIG. 12, is faced to the narrow portion of the guide groove 8b, and is positioned so that the force end 33a is projected partially, and thus the access from the outside is prevented.

Figure 15:
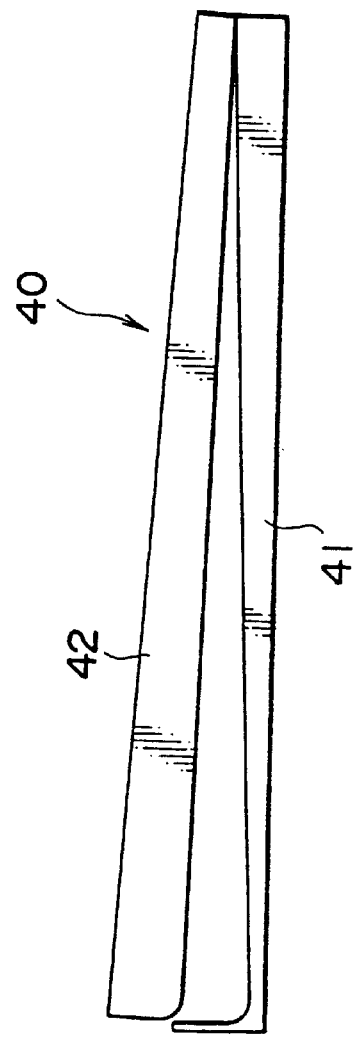
FIG. 15 is a schematic side view for illustrating the operation that the holder of the disk drive is opened and the disk cartridge is attached.
Figure 15:
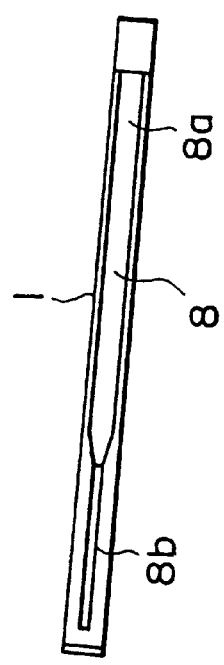

The disk cartridge 1 structured as described herein above is used set in a disk drive 40 having the structure, for example, as shown in FIG. 13 to FIG. 17. The disk drive 40 comprises a body 41 provided with a driving mechanism such as a motor and a holder 42 in which the disk cartridge 1 is attached, and the holder 42 is jointed open-close movably to the body 41 with interposition of a hinge mechanism 43. The degree of open-close angle which allows the disk cartridge to be attached in the holder 42 may be sufficient, in detail, the degree may be the angle corresponding to the thickness of the holder 42 as shown in FIG. 15.

Figure 16:
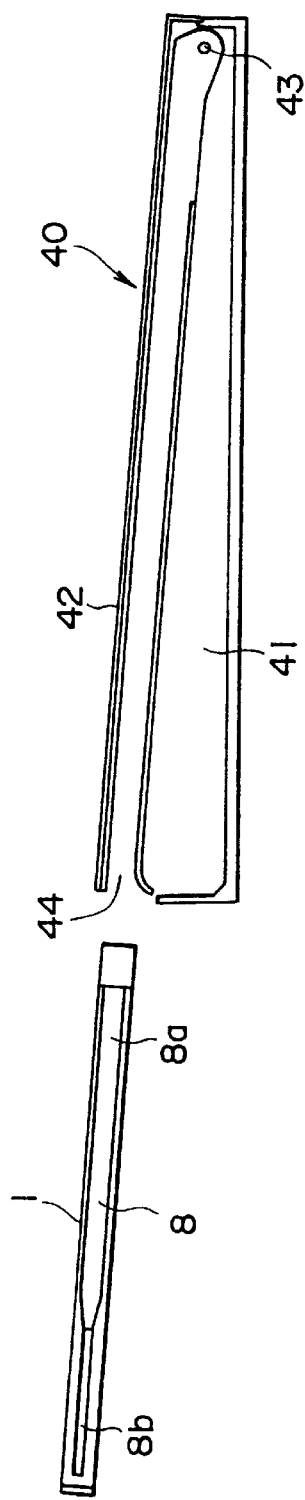
FIG. 16 is a cross-sectional view of the disk drive from which the interior is omitted in the condition of FIG. 15.
Figure 17:
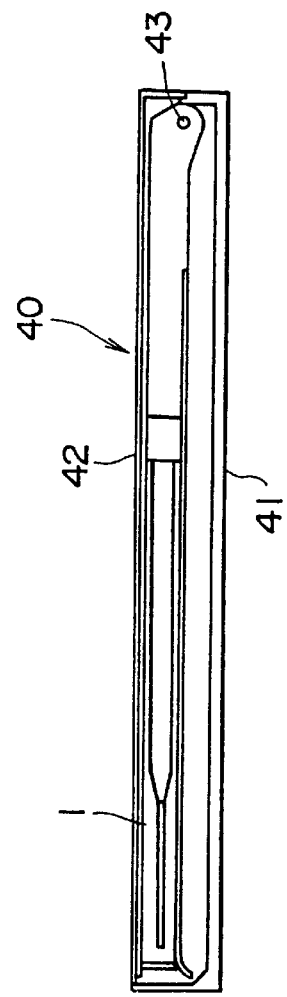
FIG. 17 is a schematic cross-sectional view for illustrating the holder member closed after attaching the disk cartridge of the present invention to the holder member of the disk drive.

An opening 44 with a certain width is provided to the holder 42 as shown in FIG. 16, a disk cartridge is inserted through the opening 44, and the holder 42 is closed as the disk cartridge 1 is contained in the body 41 as shown in FIG. 17, and then the disk drive 1 is driven.

In this case, in the disk cartridge 1 of the present invention, the shutter member 5 opens the opening 6 and chuck hole 12 correspondingly to insertion operation of the disk cartridge 1 into the holder 42, the actuator arm provided with a certain head enters into the disk cartridge 1 from the opening 6, and the head writes and read record information in/from the disk 4.

The structure is described with reference to FIG. 18 to FIG. 21. In the disk cartridge 1, only the bottom shell 2 is shown with omission of the top shell 3 and disk 4 for easy understanding of the open-close mechanism of the shutter member 5, and the holder 42 is described schematically.

An open-close member 45 of the shutter member 5 is provided on the one side of the opening 44 of the holder 42 of the disk drive 40. The open-close member 45 is formed in a configuration of a balance as a whole, and provided with a shaft support 46 approximately at the middle point, and supported on the shaft support 46 movable in a "seesaw" motion, the one end is served as the action end 45a and the other end is served as the copying end 45b, and the copying end 45b is pressed so as to be positioned in the inside.

Stopper members 47 and 48 projects toward the inside at a position approximately at the middle of the opening 44 in order to prevent erroneous attaching of the disk cartridge and maintain the proper attaching condition. The length of the projection of the stopper members 47 and 48 corresponds to the length of both sides 1c and 1d of the disk cartridge 1, for example, the depth of the stopper member 47 corresponds approximately to the length L1 and the depth of the stopper member 48 corresponds approximately to the length L2.

Because the stopper members 47 and 48 are different in the depth size, if a disk cartridge 1 is inserted erroneously inside out, the longer side 1c of the disk cartridge 1 strikes first the stopper 48 having the smaller depth to hinder complete or proper attaching, and thus one can recognize immediately that this attaching is erroneous.

Further the actuator arm 49 provided to the body 41 is in stand-by at the inner part of the stopper members 47 and 48. The actuator arm 49 is formed in a unique generally L-shape provided with a head 50 at the front end and an actuator 51 at the rear end. The actuator arm 51 is attached so as to be rotatable around the shaft 52, and is rotated in the direction of the arrow-a. Though the configuration of the actuator arm 49 is unique, but the actuator arm 49 is similar to the conventional one in the fork shape and functions.

Figure 18:
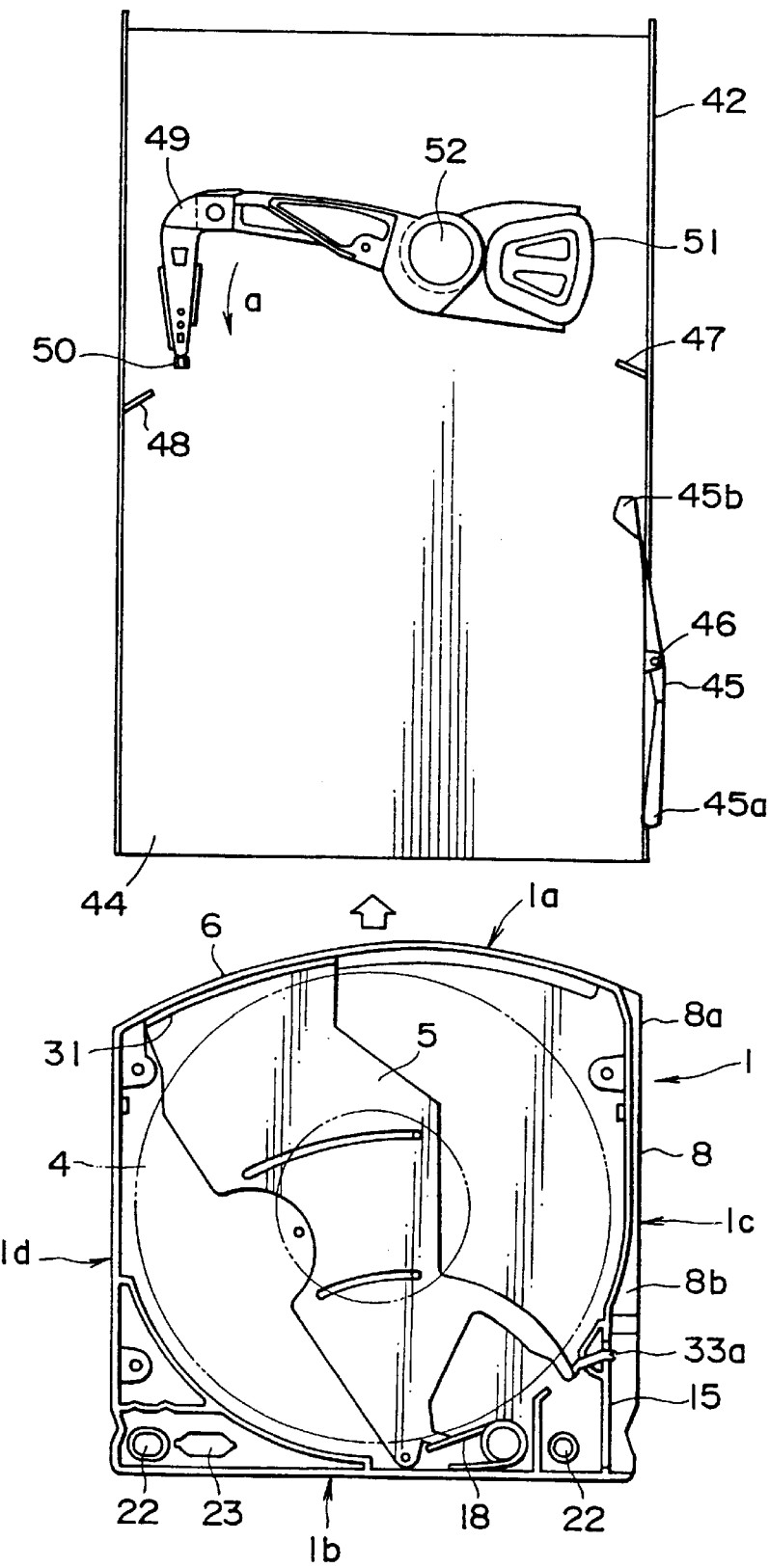
FIG. 18 is a diagram for illustrating the operation for attaching the disk cartridge of the present invention to the holder member of the disk drive.

Then, the disk cartridge 1 is inserted properly into the opening 44 of the holder 42 with the front end 1a at the head so that the open-close member 45 engages with the guide groove 8 as shown in FIG. 18.

Figure 19:
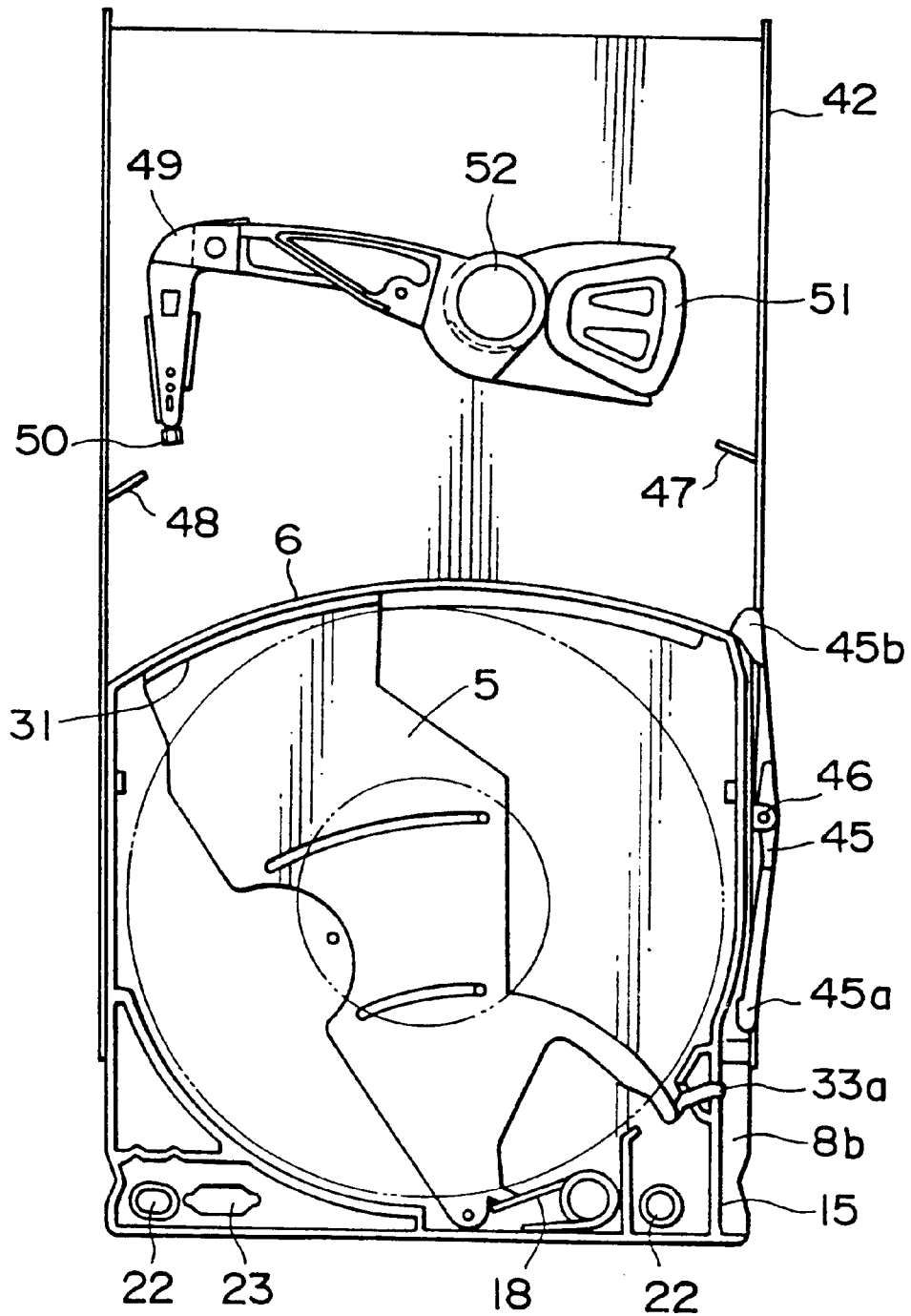
FIG. 19 is a diagram for illustrating the transition of the operation for attaching the disk cartridge of the present invention to the holder member of the disk drive.

When the disk cartridge 1 is inserted as described herein above, the action end 45a of the open-close member 45 is engaged first with the guide groove 8, in continued insertion, the copying end 45b is engaged with the guide groove 8. When the copying end 45b is engaged with the guide groove 8, the action end 45a is moved to the deep groove 8b portion of the guide groove 8 near the rear end as shown in FIG. 19. During further insertion, the copying end 45b is engaged with or grounded on the shallow groove 8a near the front end, thereby the action end 45a proceeds with engaging with the deep groove 8b near the rear end due to a generally seesaw motion.

Figure 20:
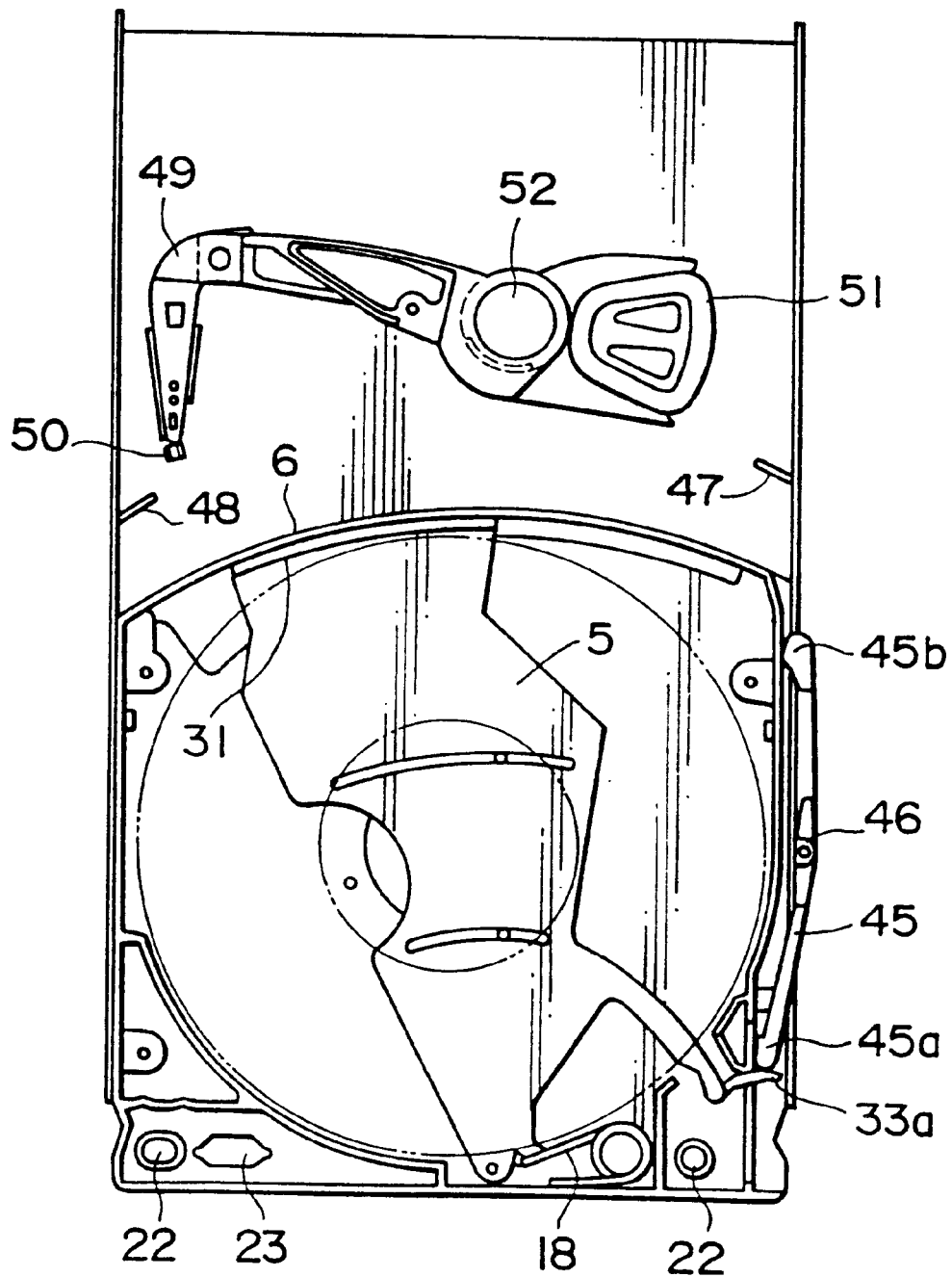
FIG. 20 is a diagram for illustrating the further transition of the operation for attaching the disk cartridge of the present invention to the holder member of the disk drive.
Figure 21:
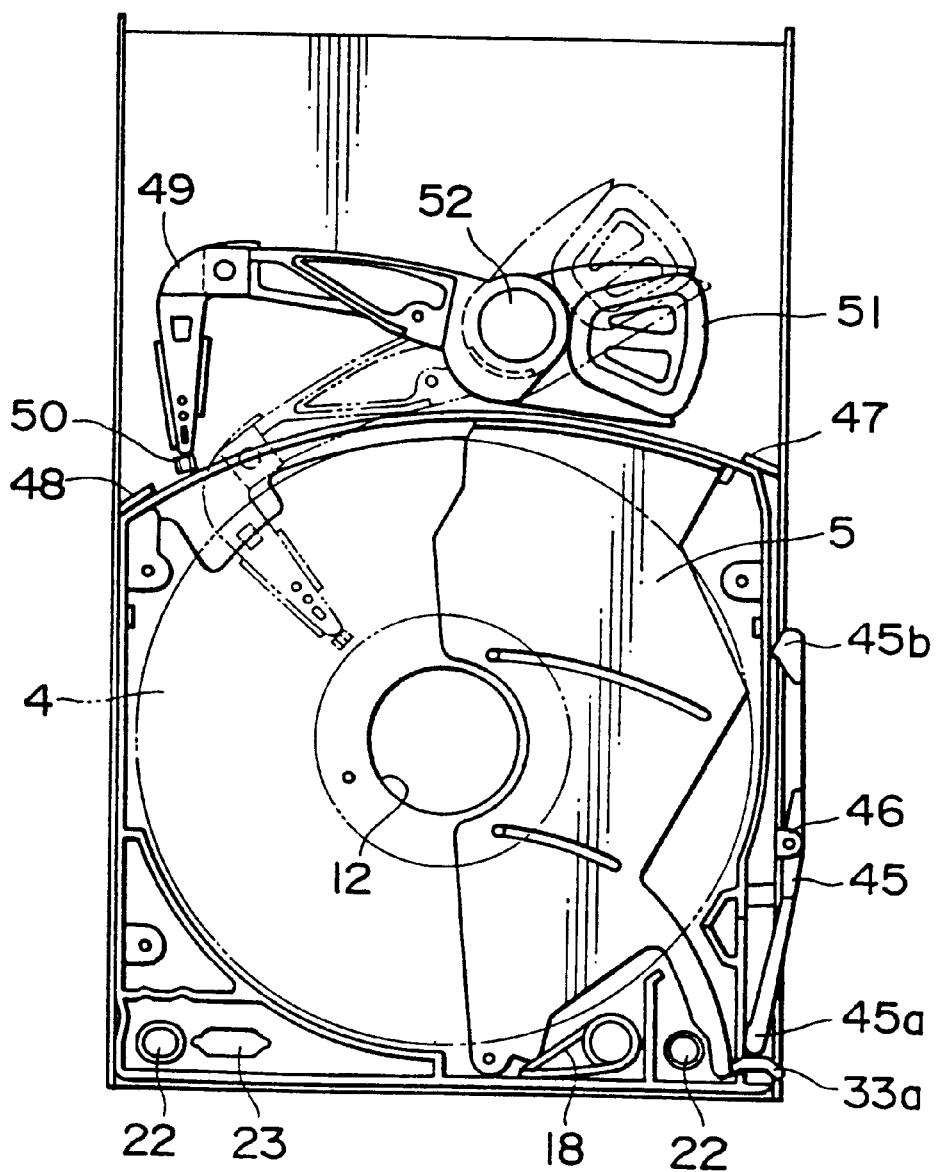
FIG. 21 is a diagram for illustrating the operation for attaching the disk cartridge of the present invention to the disk holder of the disk drive.

The action end 45a abuts the force end 33a of the arm 33 which projects into the deep groove 8b as shown in FIG. 20, and in further insertion of the disk cartridge 1, the action end 45a presses down the force end 33a successively, correspondingly, the shutter member 5 is rotated around the shaft 16 successively with resisting to the pressing means, and when the disk cartridge 1 is brought into contact with the stopper members 47 and 48 in proper condition as shown in FIG. 21, a proper attaching is confirmed, the shutter member 5 is opened fully, the opening 6 which was closed with the shutter member 31 is opened fully, and the chuck hole 12 of the bottom shell where the center core 11 is positioned is opened.

If the disk cartridge 1 is inserted erroneously inside out, the longer side 1c of the disk cartridge 1 is inserted at the position left from the opening 44 in the drawing, the side 1c strikes the stopper member 48 and can not proceed further before the disk cartridge 1 is completely inserted, the disk cartridge 1 is not brought into contact with the head 50 of the waiting actuator 49. Therefore the head is protected from damage even when the cartridge 1 is inserted erroneously.

When the opening 6 is opened, the actuator arm 49 is rotated as shown with an imaginary line, the opening becomes ready for insertion of the tip of the actuator arm 49 into the disk cartridge 1. Simultaneously, the chuck hole 12 of the bottom shell 2 which was closed by the shutter member 5 becomes opened. Nevertheless, the structure that the open-close member 45 is engaged with the guide groove 8 and the guide groove 8 comprises the shallow and wide portion and deep and narrow portion ensures the transmission of open-close action to the force end 33a of the shutter member 5, and thus the shutter member is opened and closed consistently.

Figure 22:
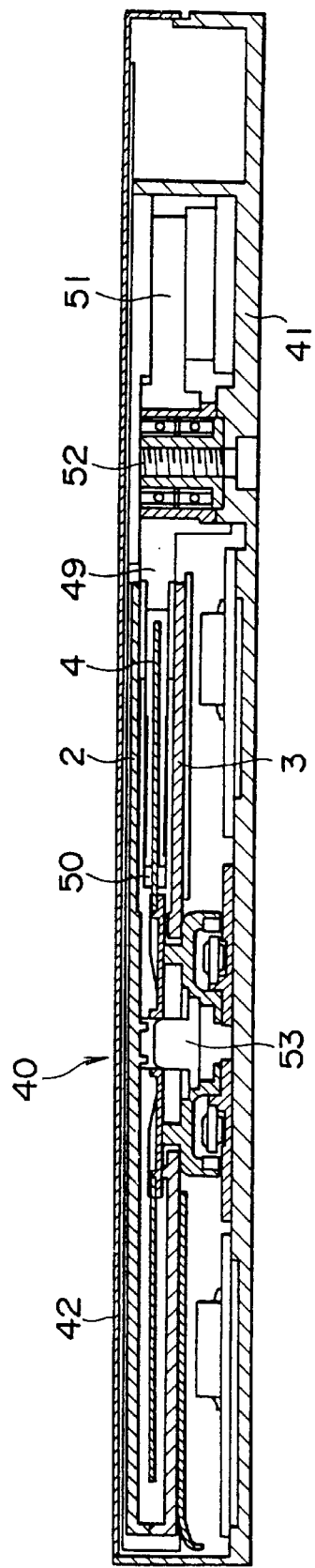
FIG. 22 is a schematic cross-sectional view for illustrating the disk cartridge of the present invention attached to the disk drive.
Figure 23:
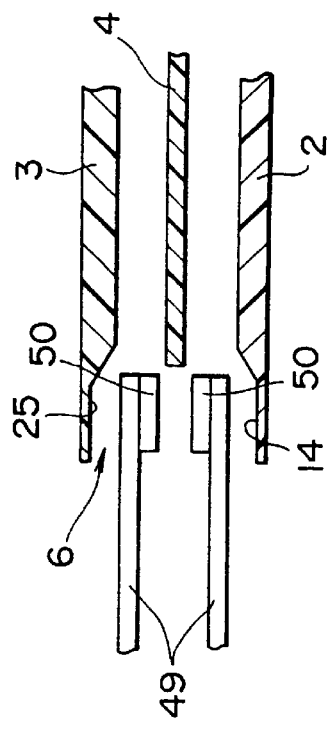
FIG. 23 is a partially enlarged schematic cross-sectional view for illustrating an actuator arm provided to the disk drive which is inserted from the opening of the disk cartridge into the internal.

Herein as shown in FIG. 22, by closing the holder 42 of the disk drive to the body 41, the drive transmission means 53 provided on the body 41 side is engaged with and transmits drive to the center core 11 of the disk 4 through the opened chuck hole 12 of the disk cartridge 1, and the actuator arm 49 is brought into the inside of the disk cartridge 1 from the opened opening 6 to be ready for driving (reading and/or writing of information), and drives according to the predetermined operations.

In the closing operation of the holder 42 to the body 41, because the angular rotation is limited to the degree corresponding to the thickness of the holder 42 and the disk cartridge 1 is set at the position relatively far from the rotation center, vertical motion caused from open-close motion draws an approximately vertical locus, and because the distance between the drive transmission means 53 and the center core 11 of the disk 4 is relatively short, blurring in vertical and horizontal directions is eliminated, both components are engaged always properly. The disk cartridge 1 has a positioning hole 22, a positioning pin (not shown in the figure) provided to the body 41 is inserted into the hole 22 to ensure proper insertion of the disk cartridge 1.

After the disk cartridge 1 is set correctly at the proper position, the actuator arm 49 is rotated to enter into the inside of the disk cartridge 1, and positioned so as to vertically hold the disk 4 provided in the inside. The thin walls 14 and 25 formed on the opening 6 of the disk cartridge 1 guide the actuator arm 49, and the wide opening allows the actuator arm 49 to enter easily.

What is claimed is:

1. A removable disc cartridge comprising a case including a top shell and a bottom shell which contains rotatable a disc, said removable disk cartridge being insertable into a disk drive and having a curved portion formed on one side;

a guide groove formed on at least one other side;

an opening formed on a portion of said curved portion;

at least three supports for supporting the center core of the disk provided on the inside surface of said bottom shell;

a shutter for opening and closing said opening, said curved portion being asymmetrical in the left and right directions with respect to a center line along the direction of insertion into the disk drive, wherein said shutter comprises a flat plate section and a circular arc shutter member formed in the direction perpendicular to the end of the flat plate section and wherein said flat plate section is formed of metal, and said shutter member is formed of plastic; and an arm which is disposed in the guide groove for opening and closing the shutter.

2. A removable disk cartridge comprising a case including a top shell and a bottom shell which contains rotatably a disk, said removable disk cartridge being insertable into a disk drive and having:

a curved portion formed on one side;

a guide groove formed on at least one other side and comprising a first groove portion having a first width and a first depth and a second groove portion having a second width which is narrower than the first width and a second depth which is deeper than the first depth;

an opening formed on a portion of said curved portion;

a shutter for opening and closing said opening, said curved portion being asymmetrical in the left and right directions with respect to a center line along the direction of insertion into the disk drive; and an arm which is disposed in the guide groove for opening and closing the shutter.

3. A removable disk cartridge comprising a case including a top shell and a bottom shell which contains rotatably a disk, said removable disk cartridge being insertable into a disk drive and having:

an curved portion formed on one side;

an opening formed on a portion of said curved portion;

a shutter for opening and closing said opening, said curved portion being asymmetrical in the left and right directions with respect to a center line along the direction of insertion into the disk drive wherein said shutter comprises a flat plate section formed of metal and a circular arc shutter member formed of plastic and in a direction perpendicular to the end of the flat plate section; and at least three supports for supporting the center of the disk provided on the inside surface of said bottom shell.

* * * * *